United States Patent [19]
Ward

[11] Patent Number: 4,823,284
[45] Date of Patent: Apr. 18, 1989

[54] HIGH SPEED VLSI BASED SERIAL TO MULTIPLEXED DATA TRANSLATOR

[75] Inventor: Joseph W. Ward, Pittsford, N.Y.

[73] Assignee: Xerox Corporation, Stamford, Conn.

[21] Appl. No.: 120,906

[22] Filed: Nov. 16, 1987

[51] Int. Cl.$^4$ ............................................. G01D 15/00
[52] U.S. Cl. ..................................... 364/519; 346/154
[58] Field of Search ............... 346/155, 154, 158, 159, 346/160; 364/518–523; 377/54, 77, 78; 400/119

[56] References Cited

U.S. PATENT DOCUMENTS

| | | | |
|---|---|---|---|
| 4,180,813 | 12/1979 | Yoneda | 340/784 |
| 4,247,856 | 1/1981 | Fumeron | 340/771 |
| 4,392,131 | 7/1983 | Walter | 340/803 |
| 4,463,363 | 7/1984 | Gundlach et al. | 346/159 |
| 4,524,371 | 6/1985 | Sheridon et al. | 346/159 |
| 4,584,592 | 4/1986 | Tuan et al. | 346/159 |
| 4,591,885 | 5/1986 | Day et al. | 346/159 |
| 4,725,967 | 2/1988 | Aiba et al. | 364/519 |
| 4,746,941 | 5/1988 | Pham et al. | 346/154 |

*Primary Examiner*—Arthur G. Evans
*Attorney, Agent, or Firm*—Ronald F. Chapuran

[57] ABSTRACT

A fluid jet assisted electrographic marking apparatus for placing electrostatic charges upon a receptor surface in an imagewise pattern by converting high speed serial data into real time parallel applied data including means for supplying a transport fluid, a housing including an upstream ion generation region and a downstream ion modulation region, the housing including inlet means for receiving transport fluid from the means for supplying located upstream of said ion generation region, ion modulation means located at the ion modulation region, an outlet means from which transport fluid exits the housing, said ion modulation means including charged storage means having electrically conductive electrodes positioned adjacent the path of the transport fluid in the ion modulation region for controlling the passage of ions out of said housing, and a data translator for converting the serial data into real time parallel applied data, the charge storage means and the electrodes being integrally fabricated upon a substrate, the data translator being wire bonded or fabricated upon or otherwise integrally connected upon and to the substrate.

19 Claims, 11 Drawing Sheets

HIGH SPEED VLSI BASED SERIAL TO MULTIPLEXED DATA TRANSLATOR

The invention relates to a fluid jet assisted ion projection electrographic marking apparatus and, in particular, to low cost, high speed VLSI (Very Large-Scale Integration) based serial to multiplexed data translator for such a marking apparatus.

BACKGROUND OF THE INVENTION

The imaging process used herein is described, with respect to a fluid jet assisted ion projection printer, in commonly assigned U.S. Pat. No. 4,463,363. In the printer described in that patent, imaging ions are first generated and then deposited upon a moving receptor by means of a linear array of selectively controllable, closely spaced, minute air nozzles. The ions of a single polarity, preferably, positive are generated in an ionization chamber by a high voltage corona discharge and then are transported, by being entrained in a high velocity fluid, to and through the nozzles wherein they are electrically controlled by an electric potential applied to modulating electrodes. Selective application of control voltages to the modulating electrodes in the array will establish a field across the nozzle to inhibit passage of ions to each nozzle. Alternatively, ions are allowed to pass through the nozzle if the field is below a threshold value, so as to enable areas of charge to appear on the receptor surface for subsequent development.

A typical modulating structure for this type of printer is disclosed in commonly assigned to U.S. Pat. No. 4,524,371. The modulating structure is formed upon a planar marking head mounted on the ion generating housing, and each electrode thereon may be addressed individually for modulating each nozzle independently. An improved integrated printer marking head, incorporating thin film ion modulating electrodes, drive circuitry, and switching elements formed upon a single substrate is disclosed in commonly assigned U.S. Pat. No. 4,584,592. The printers described in the above-named patent rely upon the selective imposition of electrical data on the modulation electrodes. The data may be computer generated and is normally applied by any conventional data and address technique. In yet another commonly assigned U.S. Pat. No. 4,591,885, the principle of the fluid jet assisted ion projection marking process is incorporated in an apparatus for copying original images onto an image receptor. This is accomplished by causing an optical input to address a photoconductive modulation assembly formed at one end of a light collecting ribbon.

Other patents of interest are U.S. Pat. No. 4,392,131 disclosing an integrable activation module for passive electro optical displays. The module comprises a shift register for supplying data in parallel to a display matrix and a pulse generator for supplying pulses to row and column drivers in response to a signal from a transfer terminal to thereby address an n by m matrix. U.S. Pat. No. 4,247,856 discloses a sequentially scanned plasma display for alpha numeric characters comprising a clock for driving a shift register for controlling the columns of a plasma display. Data is supplied to the display from a controllable logic circuit and displayed column by successive column. U.S. Pat. No. 4,180,813 discloses a liquid crystal display device using a digital converter comprising a liquid crystal display panel receiving data in parallel from a shift register and receiving driving voltages from a scanning electrode circuit for energizing electrodes each time a ring counter receives a control signal.

A difficulty with the prior art systems is that the means to translate high speed serial (video) data into real time multiplexed parallel applied data patterns to drive a marker or printer is often complex and costly. It would be desirable to provide a low cost, high speed, VLSI based serial to multiplexed data translator for printer applications. It is an object, therefore, of the present invention to provide an interface between high speed serial data and output data patterns for a high resolution output modulation device that is simple and economical. It is another object of the present invention to provide a high speed, two wire serial interface between a circuit designed to drive a raster scan device and the x-y matrixed input of the discrete pixel modulated output devices. It is also an object to provide a low cost input voltage isolation. It is still another object of the present invention to provide a simple VLSI interface requiring only two VLSI shift registers and a simple digital divider and latch control circuitry.

SUMMARY OF THE INVENTION

Briefly, the present invention is a fluid jet assisted electrographic marking apparatus for placing electrostatic charges upon a receptor surface in an imagewise pattern by converting high speed serial data into real time parallel applied data including means for supplying a transport fluid, a housing including an upstream ion generation region and a downstream ion modulation region, the housing including inlet means for receiving transport fluid from the means for supplying located upstream of said ion generation region, ion modulation means located at the ion modulation region, an outlet means from which transport fluid exits the housing, said ion modulation means including charged storage means having electrically conductive electrodes positioned adjacent the path of the transport fluid in the ion modulation region for controlling the passage of ions out of said housing, and a data translator for converting the serial data into real time parallel applied data, the charge storage means and the electrodes being integrally fabricated upon a substrate, the data translator being wire bonded or otherwise integrally connected, attached, or fabricated upon and to the substrate.

BRIEF DESCRIPTION OF THE DRAWINGS

For a better understanding of the present invention, reference is made to the accompanying drawings wherein the same reference numerals have been applied to like parts and wherein.

DESCRIPTION OF THE PREFERRED EMBODIMENT

Figure 1:
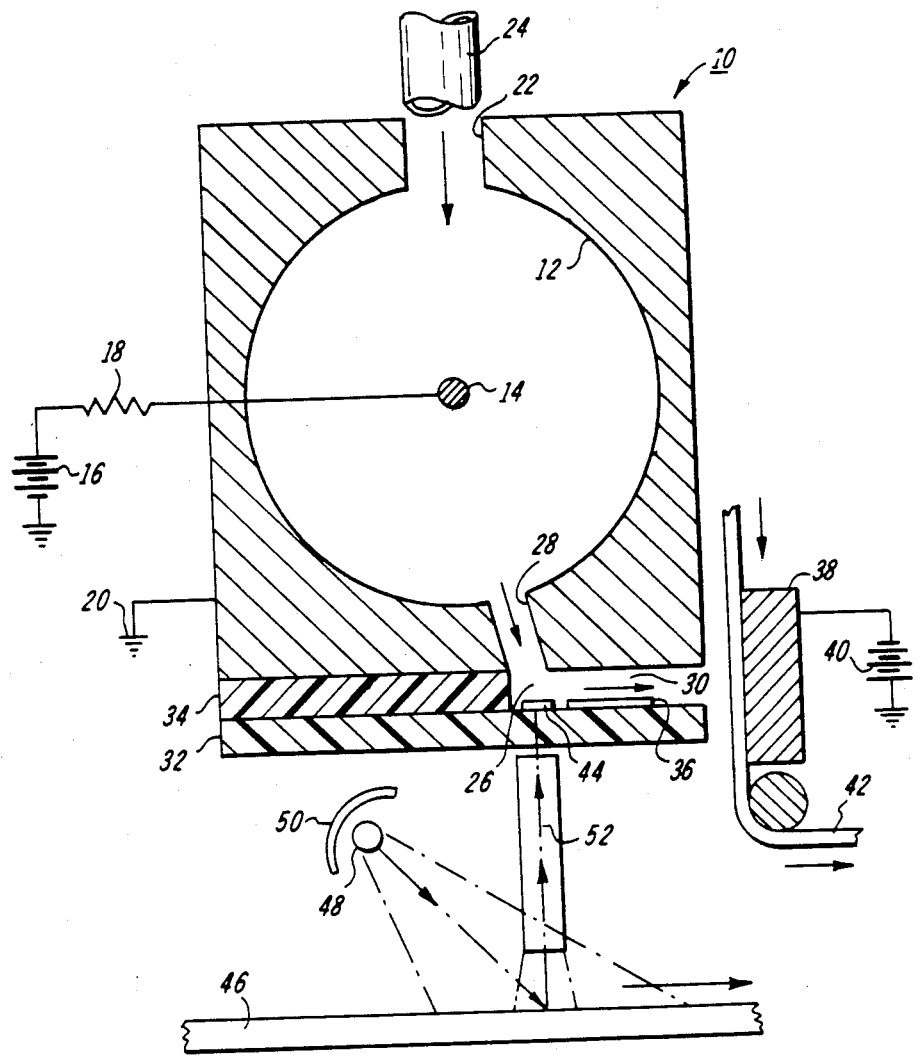
FIG. 1 is a schematic representation of an electronic printer according to the present invention.

With particular reference to the drawings, there is illustrated in FIG. 1 a housing 10 for a fluid jet assisted ion projection printing apparatus. The housing includes an electrically conductive, elongated chamber 12 and a corona discharge wire 14, extending along the length of the chamber. A high potential source 16, on the order of several thousand volts dc, is connected to the wire 14 through a suitable load resistor 18, and a reference potential source 20 (which may be ground) is connected to the wall of chamber 12. Upon application of the high potential to corona discharge wire 14, a corona discharge surrounds the wire, creating a source of ions of a given polarity (preferably positive), which are attracted to the ground chamber wall and fill the chamber with a space charge.

An inlet channel 22 extends along the chamber substantially parallel to wire 14, to deliver pressurized transport fluid (preferably air) into the chamber 12 from a suitable source, schematically illustrated by the tube 24. An outlet channel 26, from the chamber 12, also extends substantially parallel to wire 14, at a location opposed to inlet channel 22, for conducting the ion laden transport fluid to the exterior of the housing 10. The outlet channel 26 comprises two portions, a first portion 28 directed substantially radially outwardly from the chamber and a second portion 30 angularly disposed to the first portion. The second portion 30 is formed by the unsupported extension of a marking head 32 spaced from and secured to the housing by insulating shim 34. As the ion laden transport fluid passes through the outlet channel 26, it flows over an array of ion modulation electrodes 36, each extending in the direction of the fluid flow, and integrally formed on the marking head 32.

Ions allowed to pass completely through and out of the housing 10, through the outlet channel 26, come under the influence of accelerating back electrode 38 which is connected to a high potential source 40, on the order of several thousand volts dc, of a sign opposite to that of the corona source 16. An insulating charge receptor 42, is interposed between accelerating back electrode and the housing, and is moved over the back electrode for collecting the ions upon its surface in a image configuration. Subsequently the latent image charge pattern may be made visible by suitable development apparatus (not shown). Preferably, a transfer system may be employed, wherein the charge pattern is deposited upon an insulating intermediate surface such as a receptor drum or belt. In such a case, the latent image charge pattern may be made visible by development upon the receptor surface and then transferred to a final image copy sheet.

Once the ions have been swept into the outlet channel 26 by the transport fluid, it becomes necessary to render the ion-laden fluid stream intelligible. This may be accomplished by selectively controlling the potential on modulation electrodes 36 by means of photosensors 44 also integrally formed upon the marking head. In order to duplicate an original document 46 upon the charge receptor 42, the original is illuminated by a suitable light source 48. A reflector 50 concentrates the optical energy upon the original, with some of the optical energy falling within the collection angle of lens system 52. The light reflected from the original document passes through the lens system, then passes through the substrate of the marking head 32 for projecting patterns of light and dark areas from the original document 46 onto the sensors 44. Preferably, the lens system is in the form of a short optical length elongated lens strip of the Selfoc or graded index focusing type. Of course, in this configuration the substrate is made of any suitable, optically transparent material.

It should be noted that the potential or the modulation electrodes 36 need not be controlled by photosensors 44, but could be controlled directly from a source of digital data representing an image to be reproduced. The source of digital data could be stored in memory in a general purpose computer suitably interconnected to the modulation electrodes 36. An economical means for transferring digital data at high speed as required with this latter mode of imaging will be more fully disclosed herein. This digital data translation interface affords substantial advantages in simplicity, reliability and economy of implementation in the practical application of the present invention and apparatus.

As described in U.S. Pat. No. 4,463,363, once the ions in the transport fluid stream come under the influence of the modulation electrode, they may be viewed as individual "beams," which may be allowed to pass to the receptor 42 or to be suppressed within the outlet channel 30. "Writing" of a single spot in a raster line is accomplished when the modulation electrode is selectively connected to a potential source at substantially the same potential as that on the opposing wall of the outlet channel. With both walls bridging the channel being at about the same electrical potential, there will be substantially no electrical field extending thereacross. Thus, ions passing therethrough will be unaffected and will exit the housing to be deposited upon the charge receptor. Conversely, when a suitable potential is applied to the modulation electrode, a field will extend across the outlet channel to the opposite, electrically grounded, wall. If the electrical potential imposed on the modulation electrode is of the same sign as the ions, the ion "beam" will be repelled from the modulation electrode to the opposite wall where the ions may recombine into uncharged, or neutral, fluid molecules.

If the electrical potential imposed on the modulation electrode is of the opposite sign as the ions, the ion "beam" will be attracted to the modulation electrode where they may recombine into uncharged, or neutral, fluid molecules. Therefore, that "beam" of transport fluid, exiting from the housing in the vicinity of that modulation electrode, will carry substantially no "writing" ions. Voltages of intermediate magnitude will cause the ion current to be proportional thereto, allowing gray scale writing upon the charge receptor. An imagewise pattern of information will be formed by selectively controlling each of the modulation electrodes in the array so that the ion "beams" associated therewith either exit or are retarded from exiting, the housing in accordance with the pattern and intensity of light and dark spots on the original to be copied or else in accordance with stored digital information representing an image.

Figure 2:
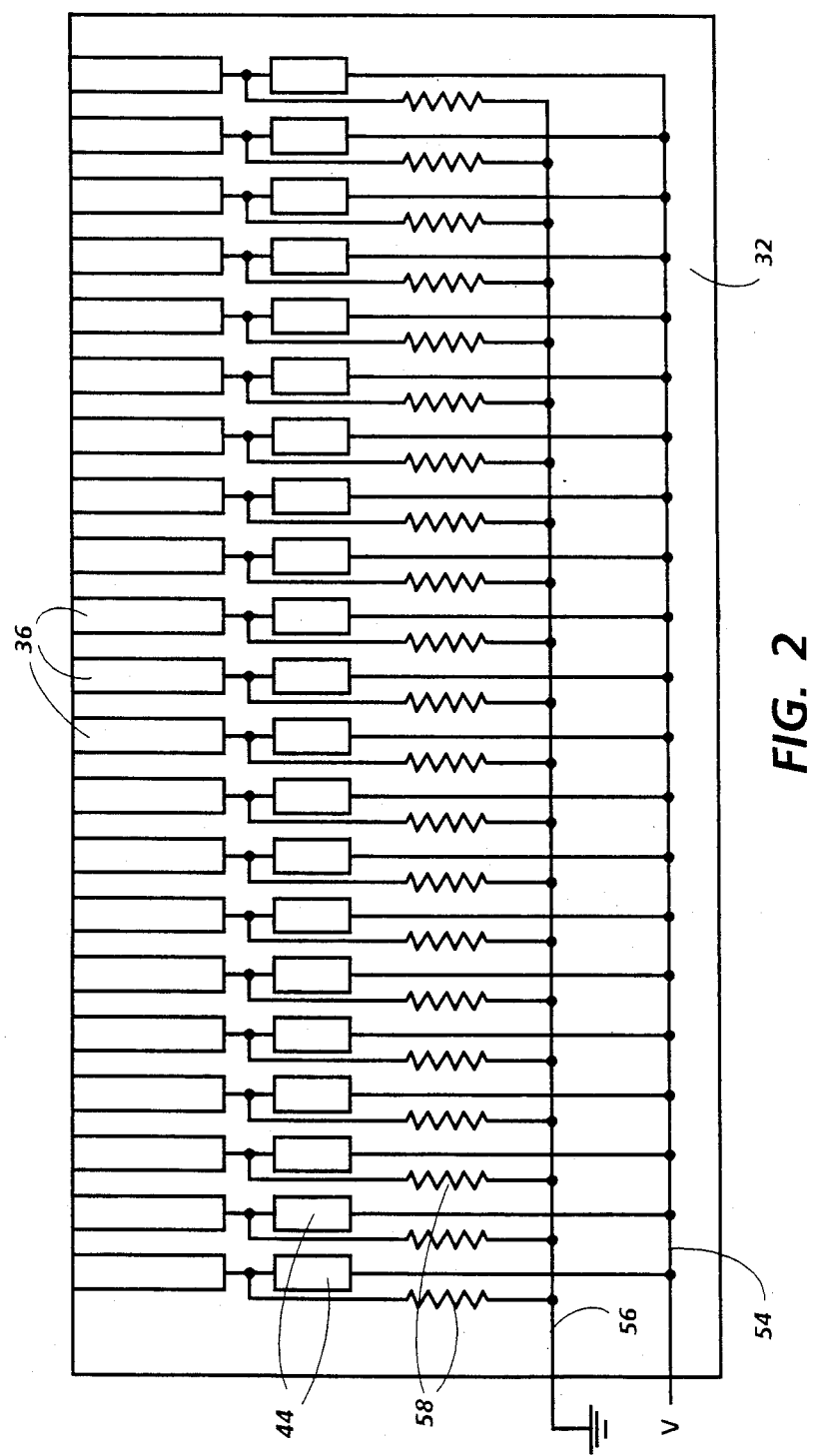
FIG. 2 is a schematic representation of one form of the marking head of the present invention showing an array of marking electrodes and sensor circuit.

With respect to FIG. 2, there is illustrated one configuration of a large area marking head 32 which may be used with the apparatus shown in FIG. 1. A suitable planar substrate of dielectric material (Preferably transparent, such as glass) has fabricated thereon, by standard thin film deposition techniques, an array of metallic modulation electrodes 36 at a density of about 300 per inch. At that density, each modulation electrode would be, for example, 2.5 mils wide, spaced from one another by 0.8 mils. The electrodes are about 60 mils long.

An array of photosensors 44, each approximately 2.5 mils by 2.5 mils, is also integrally fabricated on the substrate by standard thin film deposition techniques. Each sensor is located so that it is associated with and is electrically connected to each modulation electrode 36. A drive potential bus 54, to which each sensor is connected, extends across the substrate and is connected to a drive potential V preferably on the order of 20 or 30 volts dc. A ground bus 56, also extending across the substrate, is connected to each potential divider node 57 through load resistor 58. The drive potential bus 54, the ground bus 56, the load resistors 58 and all interconnecting conductive traces are also integrally fabricated upon the substrate by standard thin film deposition techniques.

When the sensor 44 is dark, its conductivity is very low and insufficient current flows therethrough from the drive potential bus 54. Thus, there will be an extremely small potential drop across the load resistor 58 and the voltage on the modulation electrode will be to zero volts. As explained above, in this condition, ions will be allowed to pass out of the housing to the charge receptor surface for generating a mark, i.e., a dark portion of the original document will cause the corresponding sensor to be dark, which in turn will subsequently create a dark mark on the charge receptor.

When light falls on the sensor 44, its resistance is lowered and current flows through it from the drive potential bus 54 to the ground bus 56, through the load resistor 58 (which may optionally be utilized for regulating, or limiting signal current). As the sensor resistance is much lower when fully illuminated, the potential drop thereacross is minimal, causing the node potential to be substantially equal to the drive potential. This potential, of about 20 to 30 volts dc, will appear upon the modulation electrode, causing the ions in its associated beam to be deflected to the grounded opposite wall. In this condition, ions will be prevented from exiting the housing and no mark will be generated upon the charge receptor, i.e., a light portion of the original document will cause the corresponding sensor to be light, which in turn will create no mark on the charge receptor. The charge will remain on the modulation electrode as long as the sensor is illuminated. As soon as the photosensor is made dark, the potential on the modulation electrode will be discharged to ground.

The print array just described and shown in FIG. 2 may be adapted to be modulated by digital electronic signal means by simple extension and adaptation of the photo sensor components 44. Thin film photosensors may be, and commonly are, produced in the form of phototransistors by techniques well known to those skilled in the art. Phototransistors may be activated by exposure to light at their reverse-joined PN-junction (commonly referred to as base, or gate junction), whereupon the photon energy of light lowers the energy-barrier level, and allows electron flow (hence signal conduction) through the barrier junction (i.e. from "collector" to "emitter", or "drain" to "source", for example). However, when electrical connection is made to the base, or gate, the transistor may now be modulated (from non-conduction into conduction) by application of a low-level bias signal at its base, or gate, as is generally known and practiced in the field of solid-state electronics.

Hence, the print array of the present invention may be designed to be light sensitive, thereby transposing image pattern information presented via light exposure upon the photo-sensitive linear array directly into equivalently proportional electrical modulation patterns at the print electrodes 36, and therewith, also, an equivalently proportional electrical charge potential upon the charge receptor 42, which "latent charge image" may be developed, transferred, and fixed upon ordinary plain paper or other substrate by standard means known by these skilled in the art of xerography or ionography. Furthermore, the print array may be designed to be electronically driven (either additionally or alternatively) whereupon the desired electronic image pattern is equivalently transposed, either selectably in lieu of, or in addition to, or optionally simultaneous with (hence super-imposed upon), a light image, as intended or desired by specific embodiment and application of the invention.

Figures 1, 3A:
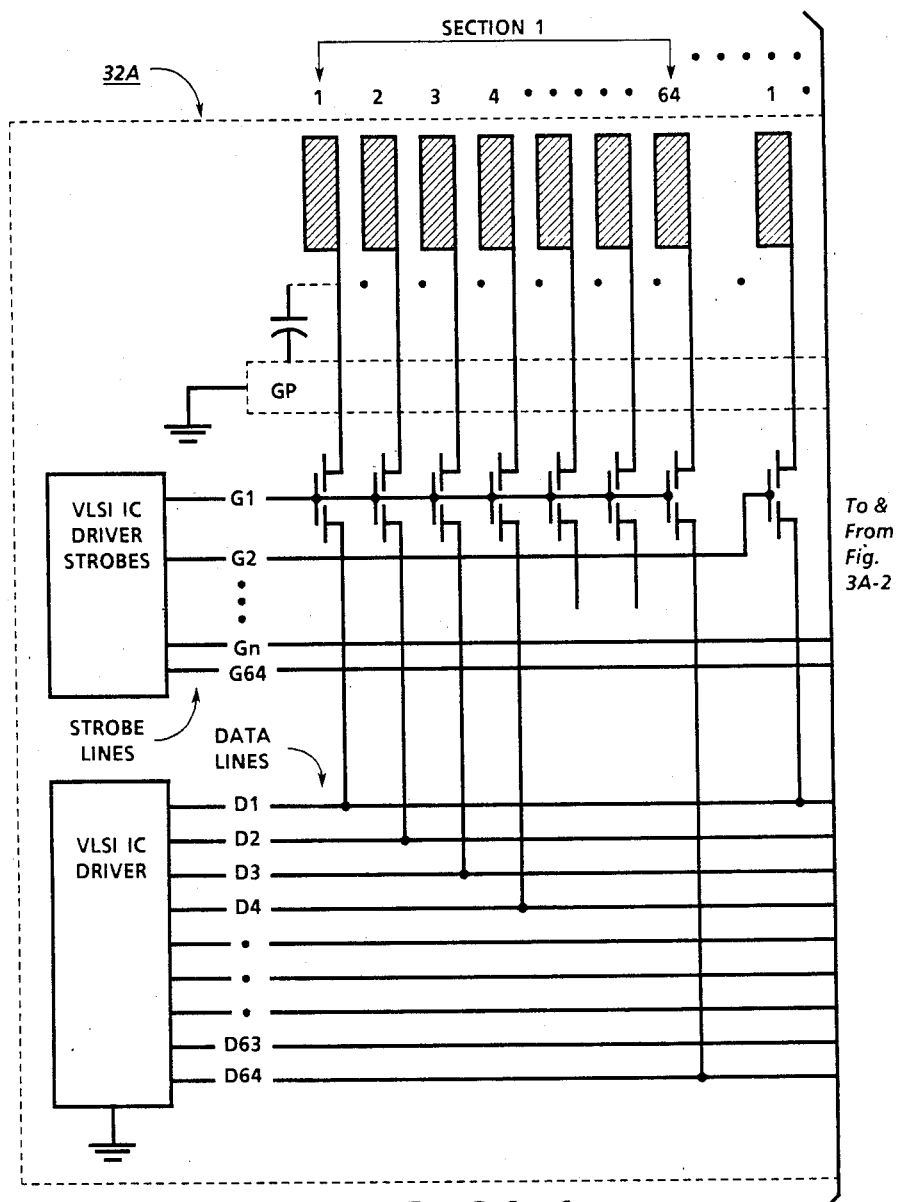
FIGS. 3A, 3B and 3C are representative of further configurations of large area marking heads which may be used in the system illustrated in FIG. 1.
Figures 2, 3A:
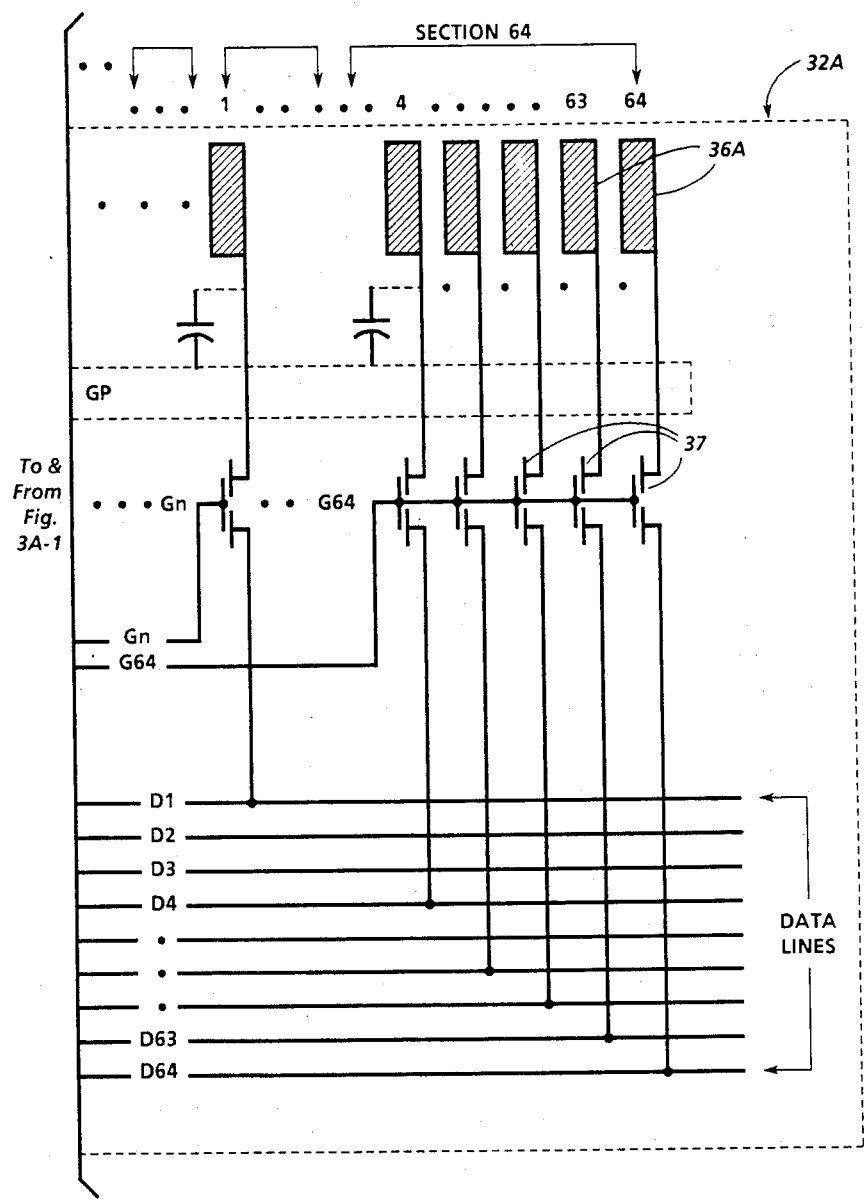

With respect to FIG. 3A, there is illustrated another configuration of a large area marking head, generally illustrated at 32A, which may be used with the apparatus shown in FIG. 1. This is comprised of a suitable planar substrate of dielectric material (such as glass, for example) and it has fabricated thereon, by standard precision thin film deposition techniques, an array of metallic modulation electrodes, 36A, at a density of 300 per inch, for example at suitable dimensions and interelectrode spacing.

For this embodiment, there is an array of amorphous-silicon thin film transistors 37 fabricated on the substrate by precision thin film deposition methods. (These may be integral, additional, or alternate to the array of photosensors 44 - light sensitive phototransistors previously described.)

Each transistor is associated with and is electrically connected at one terminal with a corresponding modulation electrode 36A, its "source" for example, in the classical model of a metal-oxide semiconductor (MOS) transistor. The opposing electrical terminal, the "drain", of the MOS transistor is connected to one of many drive potential buses, labeled and referred to collectively as "data lines", D1, D2 . . . Dn, where n may be any desired integer number, according to a convenient fractional ratio of the intended number of modulation electrodes in the array which are to be driven with image data signals. In the particular configuration, for example, where it is desired to print an 8½ wide line with the marking head and print array, with 300 spots per inch image resolution, there would be some 2,550 (8½×300) modulation electrodes constructed on the print array, and may be some 40 data lines for convenient design purposes for reasons to be explained. Alternately, an 11 inch wide print array, with 3,330 electrodes, may have some 50 data lines, or an array with up to 4096 electrodes may employ some 64 data lines, for convenience (as shown in FIG. 3A).

It should be noted that adjacent transistors are preferably connected in orderly fashion to adjacent electrodes at their "sources", and to adjacent (or successively assigned, in either ascending or descending order) different data lines at their "drains", for the conveniently defined group of "n" transistors (corresponding to a contiguous section of "n" electrodes where n=64 in FIG. 3A). Another group of "n" transistors, attached to electrodes "n+1" through "2n" in ordered fashion at their sources, is repetitively connected at their drain terminals to the same set of previously assigned data lines in the same successive pattern.

In completely repetitious fashion, additional groups of transistors are identically connected to successively adjacent sections of modulation electrodes, and also successively to the same ordered set of data lines, for the entire length of the print array, encompassing all active modulation electrodes. Hence, all active modulation electrodes are individually controlled by corresponding drive transistors ordered into repetitious groups of "n", repeated a desired number "m" times, according to the full extent of the print array, where the total number of active electrodes $T \leq m \times n$. It should now also be noted that all "n" transistors in a given group have their respective gate terminals commonly connected together and assigned as one of m "data strobe lines", G1, G2, . . . Gm.

In this arrangement, each group of transistors may be activated during a time interval which is mutually exclusive from the remaining (M−1) groups, and during which interval the desired image-data signals, corresponding to an intended electrode modulation pattern in a given section "m(t)","(1≦m(t)≦m)", have been applied on the data lines. The strobe activation of the transistor gates causes all n transistors in the group to be conductive between drain and source terminals and allows the then-applied n unique bits to transfer to the corresponding n modulation electrodes. The typical drive potential range may be on the order of 20 to 30 volts as previously indicated.

Furthermore, successively applied data strobe pulses may be applied in ordered synchronism with intended data bit patterns, in sequential groups of n bits, at very high data presentation rates, which may be on the order of many million bits per second with the present state of the art.

In accordance with such time-multiplexed operation of the print array in the manner just described, it should be noted that each individual modulation electrode may be actively driven with intended data signals for a fractional time interval "t", in a larger time period "T", whereupon it is again actively driven with new data, and thereafter repeatedly refreshed in equivalently fractional intervals during successive periods. It is apparent also that the relationship $t/T \leq 1/m$ applies to this mode of operation in modulating the print array, and that the fractional interval t/T may be relatively small when the number m is relatively large. However, for optimized performance at the print array, it will generally be desired to retain the applied value of the data signal upon the electrode in the intervening interval, defined by $$(T-t)/T$$

during which the transistor is off (non-conducting). This may be effectively accomplished with the application of a small "common ground plane" "GP" across the output region of the array in close proximity to the electrodes, and therefore presenting a relatively small amount of electrical capacitance between each electrode and signal common. The resulting capacitance serves to deter immediate change in voltage potential applied to each electrode, which serves as the charged plate of the capacitor, particularly during the inactive interval when the drive transistor is off.

Therefore, with time-multiplexed operation, proper electrode potential is retained for efficient performance by utilizing generally known "sample-and-hold" techniques for data retention, which may preferably be implemented integrally upon the print array by appropriate design features.

It should also be noted in the described multiplexed embodiment of the print array, the same array might also be adapted for direct light image modulation, when and if so desired, and as previously described. While a variety of particular design options exist for this purpose, with the equivalent result of multiple functionality of the same print array, some exemplary approaches are presented to demonstrate such functionality. For the embodiment wherein the electrode drive transistors are designed and arranged to also serve as photo transistors for for the purpose of receiving light image patterns, all strobe lines, and therefore gate connections, may be electronically disconnected, or "tristated", such that no electrical bias is applied, and simultaneously all data lines may be electronically connected to the same desirable drive potential V, whereupon the electrical configuration becomes analogous and functionally equivalent to that previously descried by FIG. 2 and related text. Alternatively, a secondary photosensor array may be appropriately placed upon the array and each sensor output terminal connected with associated electrodes in common connection with an associated transistor. This arrangement is generally recognized as a "parallel", or "wired-OR", connection of alternate drive sources in the art. For this embodiment, electronic data modulation may be disabled, when desired, by deactivating the strobe signals. In any such embodiment of multiple functionality, light modulation is disabled by convenient conventional means, such as blocking or extinguishing the source of light. Further, for any application in which light modulation may have extremely rapid change rate, and therefore wherein excessive electrode capacitance may be deleterious to rapid modulation response, the means for adding electrode capacitance for multiplexed operation may be easily modified electronically by conventional art as desired, or may be adequately minimized simply by disconnecting the common plane, "GP", (in whole or in part) from signal common "ground", for example.

Figure 3B:
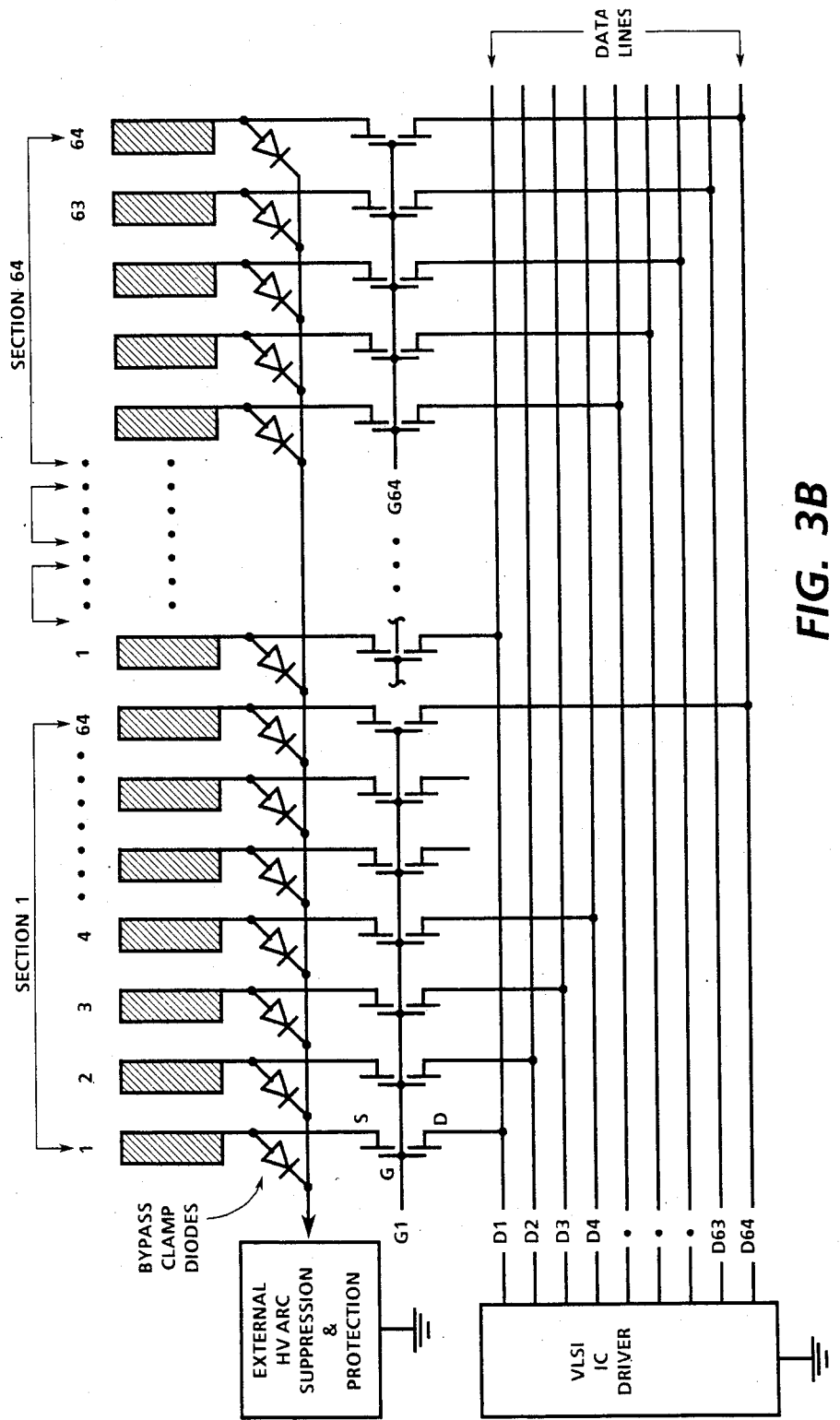
Figures 1, 3C:
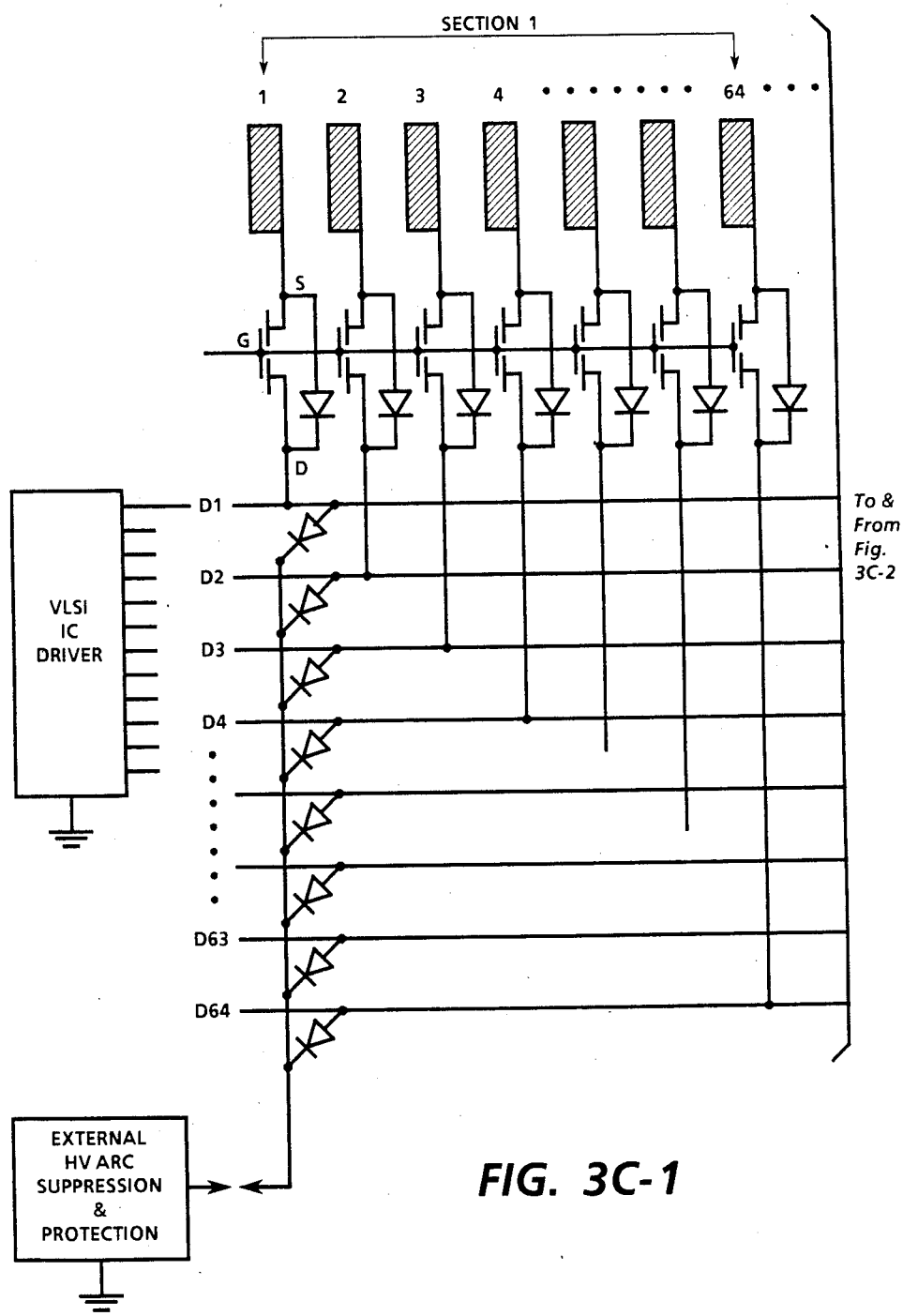
Figures 2, 3C:
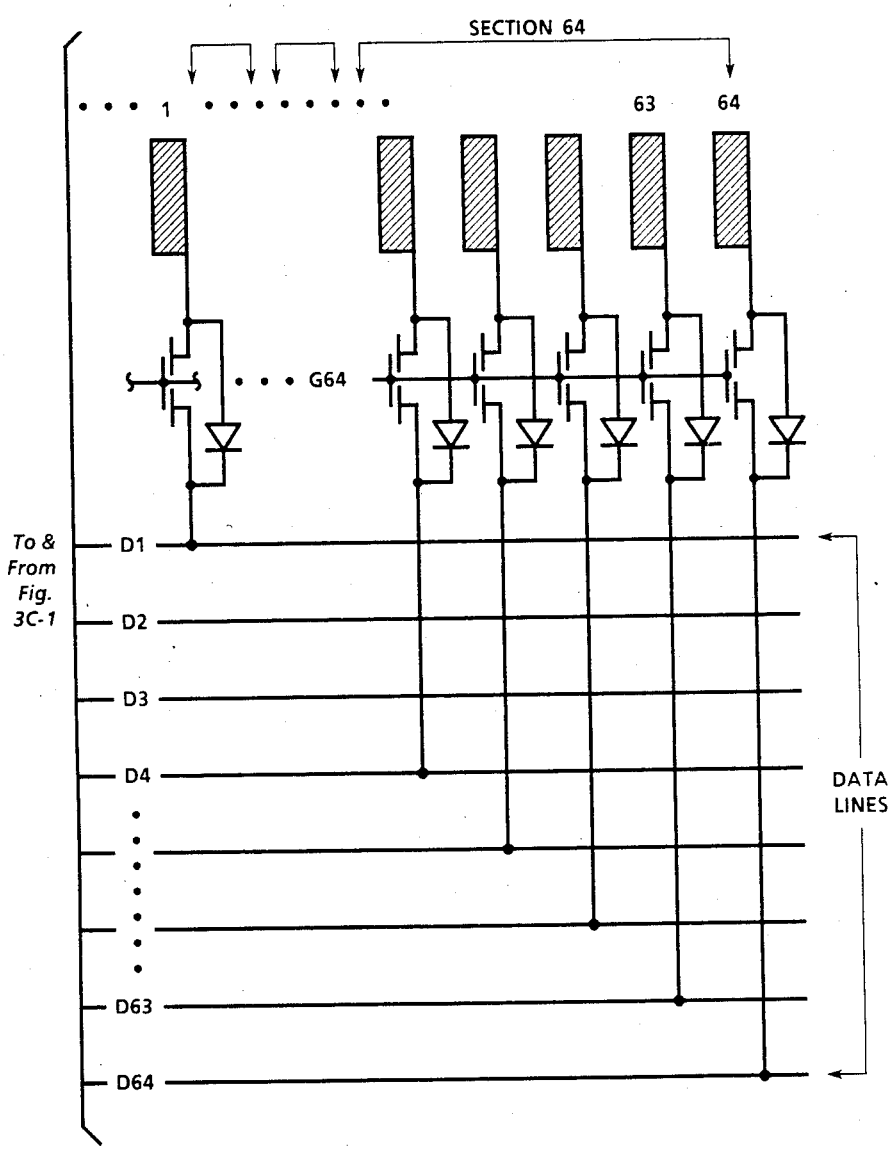

Further specific additions, and variations in detail, may be included integrally upon or adapted to the array with various purposes such as enhancing, optimizing, or customizing performance and operation to particular applications, or for ensuring reliable operation, or for protecting delicate components and circuits on and near the array from physical or electrically-induced damage. For example, for applications wherein the array may be placed, or utilized, in proximate vicinity or electrical contact with sources of high voltage potential, or else likely to generate transient electrical discharges or potential fields with relatively high energy levels, an appropriate means or circuit may be adapted integrally and/or peripherally to the array to provide intended performance and simultaneously render dangerous electrical fields or discharges harmless. Some exemplary means are shown in FIG. 3B and FIG. 3C, incorporating "voltage clamp" circuits, by techniques common in the art, to direct excessive voltage potentials away from delicate components on the array. It shall be recognized and understood that various such embodiments and enhancements are encompassed by the present invention.

Figure 4:
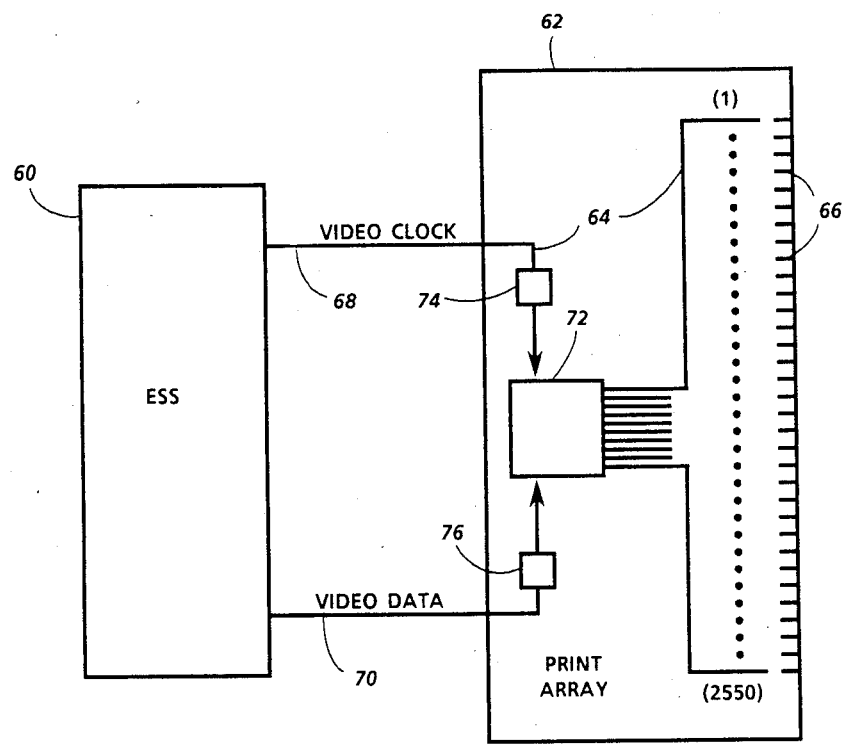
FIG. 4 is a block diagram illustrating the data translator in accordance with the present invention.

With reference to FIG. 4, there is illustrated in block diagram a serial digital (video) data signal translator in accordance with the preferred embodiment of the present invention. FIG. 4 illustrates an electronic subsystem generally shown as 60 storing image or document data to modulate a printer array generally shown at 62 (encompassing previously described salient features in FIGS. 2, 3A, 3B and 3C) to print out on a suitable receptor the image or document defined by the data stored in the electronic subsystem 60. The electronic subsystem 60 comprises suitable logic circuitry and memory storage preferably supported on a printed wiring board to store the data representing the document or the image. The printing array 62 preferably is a glass or other suitable substrate including the necessary electrical components and connections represented as the serial data translator interface circuitry 72 for inter connecting the printing array to the electronic subsystem and for modulating the probes 66 (previously described as modulation electrodes 36) on the glass substrate to print out the image or the document.

Preferably, for example, it would be desirable to print an 8½" wide line of data at one time at 300 spots per inch resolution. One option to accomplish this would be to provide 2,550 (8½×300) probes on the array 62 inter connected to the storage in the electronic subsystem 60 holding 2,550 bits of data and connected to the probes by 2,550 wires between the electronic subsystem 60 and the printing array 62. Obviously, this is impractical due to the cost and physical bulk of the interconnection.

In lieu of the just given example, an improved method of interconnection would be to provide 64 data line connections to the glass substrate 62 activated by 40 strobe signal lines, electronically driven such that successive groups of 64 data bits are presented sequentially at data lines in synchronism with the successive (incrementing) activation of 1 of the 40 strobe lines, in a time-multiplexed data signal arrangements, for each line of data to printed. An interface circuit in the electronic subsystem 60 would provide the necessary data output selecting logic (commonly known as "data-multiplexing logic"), to present parallel 64 data signals from the electronic subsystem to the printer array and also would provide 40 strobe timing pulses to selectively activate adjacent groups of 64 printer probes 40 times to print one 8½" wide line of data. Correspondingly, the printing array 62 would have its probe modulating transistor array connected in appropriate demultiplexing arrangement to receive the multiplexed data signals and distribute each to the intended output probe of the group of 2550 probes, 66, as previously described with reference to FIGS. 3A 3B and 3C. A difficulty with this improvement is that 64 data lines plus 40 strobe lines, hence 104 wires, are still needed to inter connect the probes on the printing array 62 with the corresponding 2550 data bits (contained within 64×40=2560 data bit capability of the described multiplexing logic) in the electronic subsystem, and with the need for electrical signal isolation (via suitable high-speed isolating circuitry) to enhance reliability, or to bias the printing array at high potential from logic ground, this system can also be relatively expensive and complex.

However, in accordance with the present invention, as illustrated in FIG. 4, only two inter connecting signal lines are needed between the electronic subsystem and the printing array: a video clock or strobe clock signal 68, and a video serial data line 70, for conveying the image or document data in serial form from the electronic subsystem 60 to the printing array 62. Logic circuitry 72 translates the clock and video data to modulate 2550 printing probes on the printer array by successively presenting groups of 64 data bits while strobing through 40 strobe signals in time synchronism, and thus is able to print a full line of data in a very short time interval on the receptor. The logic circuitry 72 is readily wire bonded to the glass substrate, and interconnects directly with thin-film transistors thereon to modulate output probes 66.

It should be noted that preferably the printing array or head maybe floating at approximately 1200 volts dc and that the translation of the serial data from the electronic subsystem to the printing array is at a very high speed. In such a system, only two lines need be isolated between the electronic subsystem 60 and the printer array 62 with the present invention (where the array must be biased at high potential for performance). In this case, it may be convenient to provide "opto-isolator" circuits 74 and 76. It should also be noted that instead of wire bonding the logic circuit generally represented, in part or in whole by block 72 to connect to the amorphous silicon thin film transistors on the glass substrate, the logic circuitry could be etched directly on glass along with the thin film transistors, as part of a custom integrated circuit using very large scale integration techniques, according to current and emerging advances in the art of thin film and gate array technology.

Figure 5:
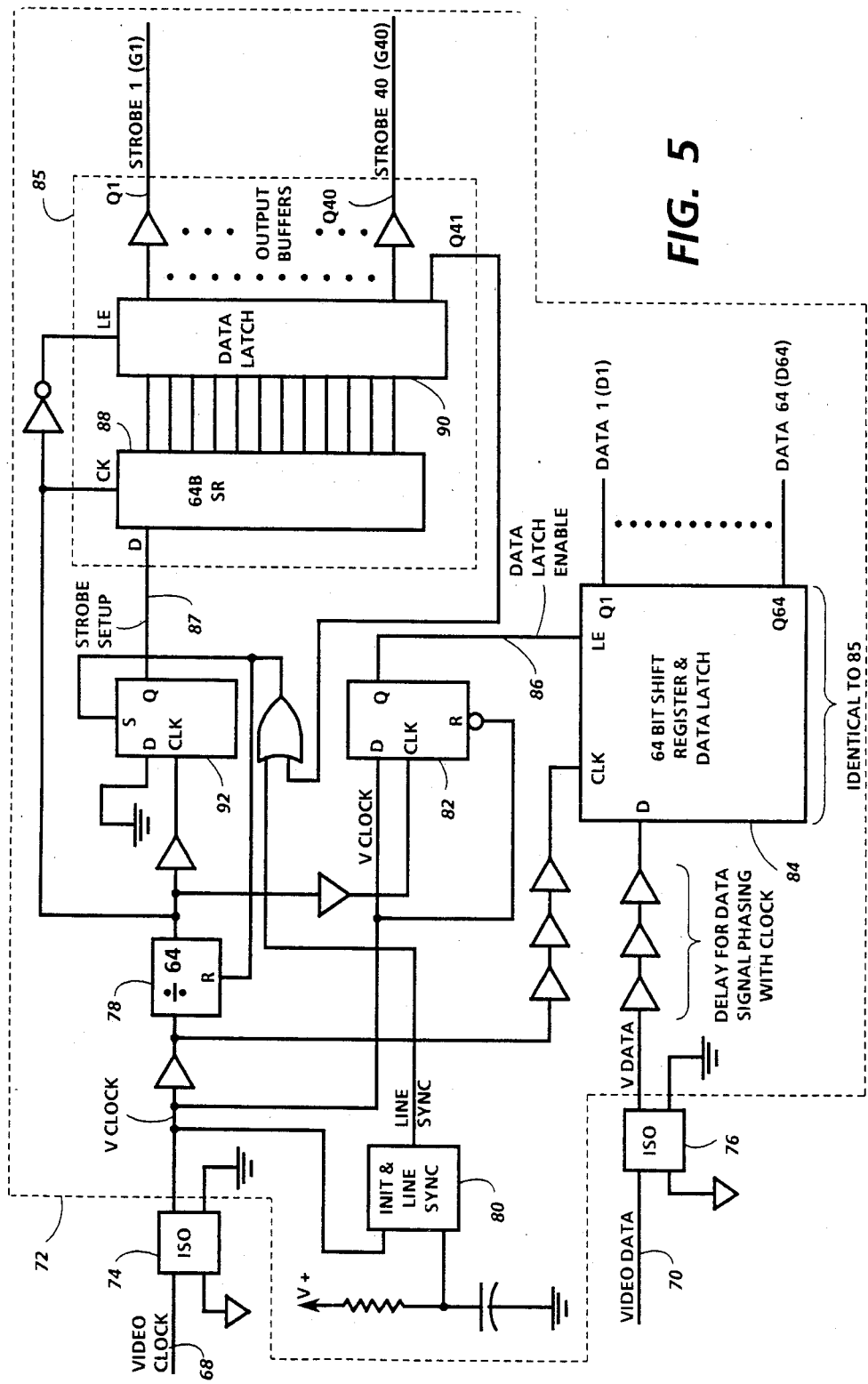
FIG. 5 is a more detailed block diagram of the data translator according to the present invention.
Figure 6A:
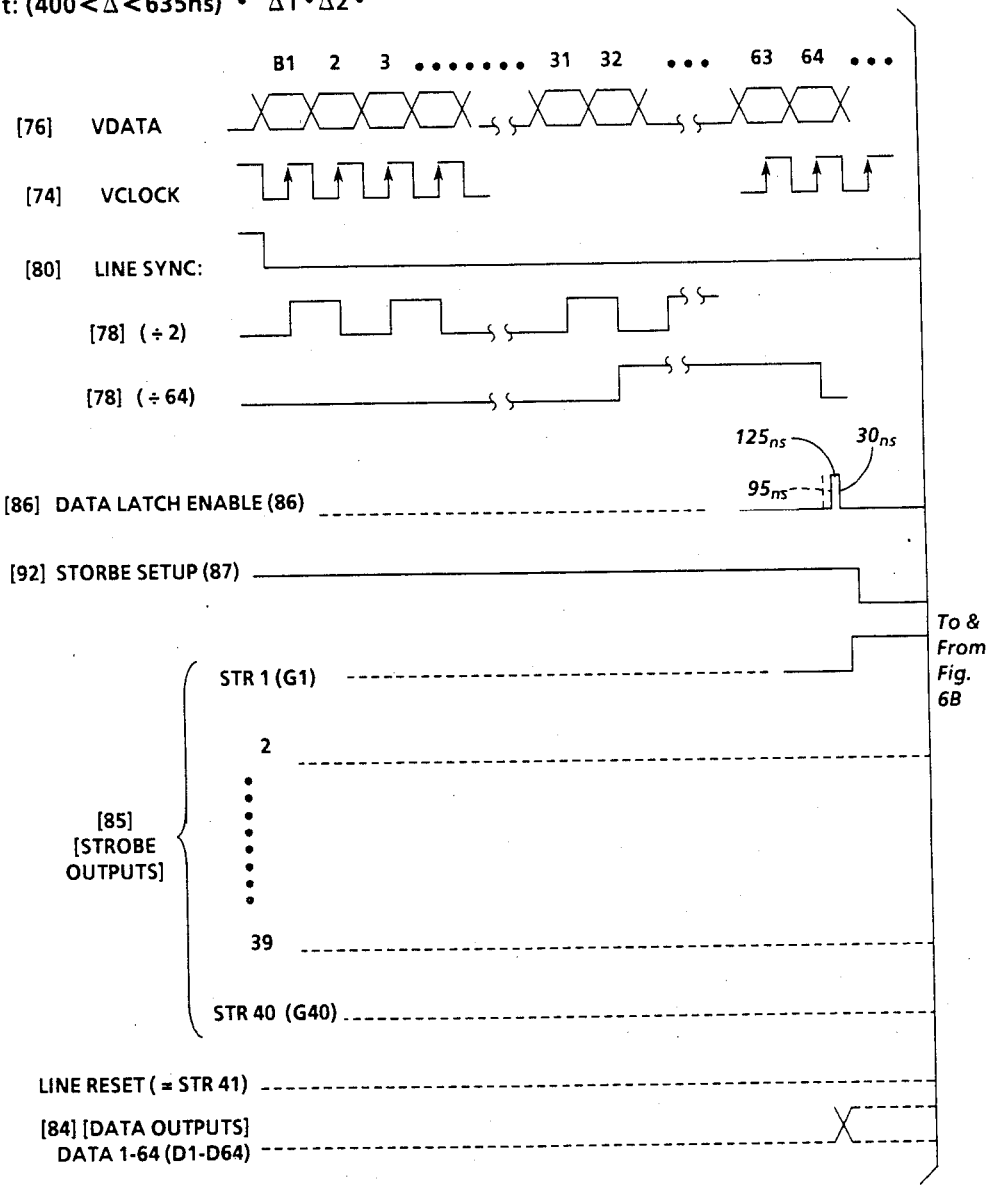
FIG. 6 is a timing diagram according to the present invention.
Figure 6B:
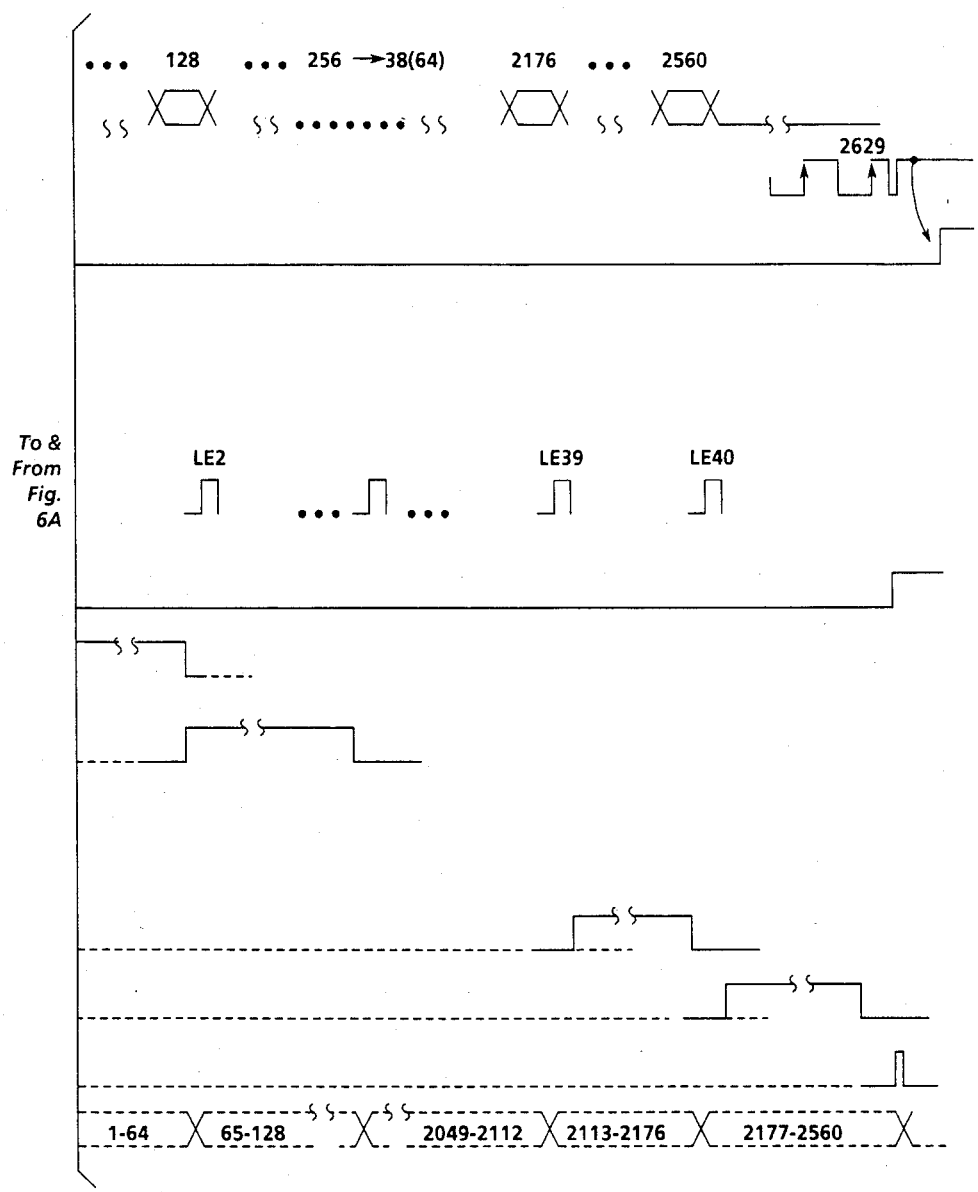

With reference to FIG. 5 and FIGS. 6A and 6B, there is shown in more detail a block diagram and timing of data translation logic circuitry 72 shown in FIG. 4. In particular, the video clock signal 68 is received by opto isolator 74, and simultaneously the video data signal 70 is received by another opto isolator 76, where isolators 74 and 76 are provided for the purpose of electrically disconnecting the image pattern outputting means 62 from the image-data production, processing, and storage means, i.e. the electronic subsystem 60. In this manner, 62 may be operated at electrical potential level much different from that of 60, as may be required.

The clock output signal from isolator 74 is substantially unmodified, except translated voltage-wise to the potential reference level of the print array 62, and is conveyed to a count-divider circuit 78, to an initialization and image-line synchronization circuitry 80, to the serial clocking input of a data-receiving shift register 84 (but slightly delayed by delaying means for appropriate timing synchronization with received data); and also to a derived control signal generation element, flip-flop 82. Further, the output of divider circuit 78, which is a less-frequently generated clocking signal, clock÷"n" (according to the desired divided-count number, "n", but time-aligned with the "nth" received clock signal, and successively the last of each repeating groups of "n" clocks thereafter) is presented to the serial clocking input of strobe-generating shift register, 85, and additionally to the latch enable input to the strobe output latches (with appropriate delay, or alternatively, these may be left in the "transparent", or "feed-through" state if so configured), within 85. Also, the output from 78 performs as clocking of a strobe-generation control element, flip flop 92, as well as previously described flip flop 82 (with appropriate edge delaying buffering elements). The output from 82 is a data-latch enable pulse signal 86 which captures "on-the-fly", (within a single clock cycle), the "n" last shifted data bits in the data latch, within 84, where they are retained and presented on data output lines D1 through D "n" while the successively next "n" data bits are being shifted into the data-shift register within 84. (The primary function of block 82 is to precisely time and contour the clock÷"n" waveform according to the timing requirements within device 84.)

Additionally, strobe generation control element 92 serves as an intialization means, data alignment means, and output data line synchronization/resynchronization means, by determining the initial position of the active strobe line, and it also ensures in the exemplary embodiment, that only one-of "m" strobe output lines from 85 is active at any time. The output state of 92, the strobe setup signal 87, is established (as true) via signals from the initialize and line synchronization circuit 80, or wraparound feedback from strobe output "m+1" (either of which drive 87 high), and disestablished (as false) upon receipt of the next received clock÷"n" pulse. The signal 87 is received by 85, wherein output strobe 1 is clocked high initially with the same clock÷"n" pulse, and thereafter, for each successively received clock÷"n" pulse, the single high state is shifted and presented at the next strobe output, repeatedly for "m" strobes, reflecting the completion of a full line of video data. This process may be repeated any number of times, representing such number of lines of video data as may be desirably presented to the print array or output device.

It should be understood that the present disclosure has been made only by way of example and that numerous changes of details of instruction of dimension, of operating rate, of timing, and the combination and arrangement of parts may be resorted to without departing from the true spirit and scope of the invention as hereinafter claimed.

I claim:

1. A data translator for converting high speed video serial data into real time multiplexed parallel applied data comprising:
   a multi pin writing head,
   a video clock signal and a video data signal,
   a first parallel shift register for receiving the video data signals,
   a second shift register for receiving the video clock signals and providing multiplexing strobe signals, said second shift register operated in time-divided synchronism with the first shift register for shifting blocks of said serial data in parallel to said multi pin writing head.

2. A data translator for converting high speed video serial data into real time multiplexed parallel applied data comprising:
   a multi electrode writing head,
   a video clock signal and a video data signal,
   a first parallel shift register for receiving the video data signals,
   a second shift register for receiving the video clock signals and providing multiplexing strobe signals, said second shift register operated in time-divided synchronism with the first shift register for shifting blocks of said serial data in parallel to said multi electrode wiring head.

3. The translator of claim 2 wherein the data and clock signals are electrically isolated from the shift registers.

4. The translator of claim 3 wherein the data and clock signals are optically isolated.

5. The translator of claim 2 wherein strobe signals are electrically isolated from output data signals.

6. The translator of claim 2 coupled with additional components in an electronic subsystem for providing additional functions.

7. The translator of claim 2 including initialing, block, group, or line synchronizing signals integrally with the clock signal, to be decoded by the data translator to provide control information.

8. The translator of claim 7 including additional signal lines for initialization, synchronization, or transference of other control information to said additional lines capable of being electrically isolated.

9. The translator of claim 2 including a remote transmitting means coupled with local receiving means for transferring clocking, data, and other synchronizing and controlling signals to the data translator, the connection between the data source and the receiving apparatus being without physical wiring connections.

10. A data translator for converting high speed video serial data into real time multiplexed parallel applied data comprising:
    a multi element writing device,
    a video clock signal and a video data signal,
    a first parallel shift register for receiving the video data signals,
    a second shift register for receiving the video clock signals and providing multiplexing strobe signals, said second shift register operated in time-divided synchronism with the first shift register for shifting blocks of said serial data in parallel to said multi element writing device.

11. The translator of claim 10 wherein the data and clock signals are isolated from the shift registers.

12. A data translator for converting high speed video serial data into real time multiplexed parallel applied data comprising:
    a multi element display device,
    a video clock signal and a video data signal,
    a first parallel shift register for receiving the video data signals,
    a second shift register for receiving the video clock signals and providing multiplexing strobe signals, said second shift register operated in time-divided synchronism with the first shift register for shifting blocks of said serial data in parallel to said multi element display device.

13. The translator of claim 12 wherein the data and clock signals are isolated from the shift registers.

14. A data translator in an electronic subsystem for converting high speed serial data into real-time multiplexed parallel applied data comprising:
    a multi component receiving device,
    a data clock signal with integral initialization synchronizing signal and a data signal,
    a first parallel shift register for receiving the data signals, and
    a second shift register for receiving the clock signals and providing multiplexing strobe signals, said second shift register operated in time-divided synchronism with the first shift register for shifting blocks of said serial data in parallel to said multi component receiving device which renders the serialized data usable, intelligible, or recognizable.

15. The translator of claim 14 wherein the data and clock signals are isolated from the shift registers.

16. A data translator applied singly or in multiplicity in an electronic subsystem for converting high speed serial data into real time multiplexed parallel applied data comprising:

a multi component receiving device, one or more data clock signals, one or more data signals, and one or more initialization synchronization signals, a first set of one or more parallel shift registers for receiving the data signals, and a second set of shift registers for receiving the clock signals and providing multiplexing strobe signals, said second set of registers operated in time-divided synchronism with one or more of the first set of shift registers for shifting blocks of said serial data in parallel to said multi component receiving device.

17. The translator of claim 16 wherein the data and clock signals are isolated form the shift registers.

18. A data translator for converting high speed serialized waveforms into real-time parallel-applied format comprising:

a multi component receiving apparatus receiving data one or more clock signals and one or more signal waveforms, including initialization and synchronization means, a first set of one or more shift registers with analog-storage for receiving the waveforms, a second shift registers for receiving the clock signals and providing multiplexing strobe signals, said second set of shift registers operated in time-divided synchronism with the first set of shift registers with analog storage means for transferring elemental components of said serial signal waveform in parallel or simultaneous presentation to said multi component receiving apparatus.

19. The translator or claim 18 wherein the data and clock signals signals are isolated from the shift registers.

* * * * *